[12] United States Patent
Fourcroy

(10) Patent No.: US 6,169,772 B1
(45) Date of Patent: Jan. 2, 2001

(54) STRETCHING SETUP AND HOLD TIMES IN SYNCHRONOUS DESIGNS

(75) Inventor: Antone L. Fourcroy, Austin, TX (US)

(73) Assignee: VIA-Cyrix, Inc., Plano, TX (US)

(*) Notice: Under 35 U.S.C. 154(b), the term of this patent shall be extended for 0 days.

(21) Appl. No.: 09/314,857

(22) Filed: Apr. 17, 1997

Related U.S. Application Data

(63) Continuation of application No. 08/418,316, filed on Apr. 7, 1995, now abandoned.

(51) Int. Cl.[7] .................................................. H04L 7/00
(52) U.S. Cl. ........................ 375/354; 375/355; 327/149; 327/150
(58) Field of Search ................................ 375/354, 355; 327/149, 150

(56) References Cited

U.S. PATENT DOCUMENTS

| 4,409,671 | 10/1983 | Daniels et al. . | |
|---|---|---|---|
| 4,469,964 | 9/1984 | Guttag et al. . | |
| 4,663,546 | 5/1987 | Eitrheim et al. . | |
| 5,132,990 | 7/1992 | Dukes . | |
| 5,259,004 | * 11/1993 | Nakayama | 375/106 |
| 5,259,006 | * 11/1993 | Price et al. | 375/107 |
| 5,369,672 | * 11/1994 | Matsumoto | 375/106 |
| 5,402,453 | * 3/1995 | Vavreck et al. | 375/118 |
| 5,475,715 | * 12/1995 | Hase et al. | 375/354 |
| 5,487,092 | * 1/1996 | Finney et al. | 375/354 |
| 5,513,209 | * 4/1996 | Holm | 375/354 |
| 5,548,620 | * 8/1996 | Rogers | 375/354 |
| 5,548,622 | * 8/1996 | Ma | 375/354 |
| 5,974,102 | * 10/1999 | Eo et al. | 375/354 |

* cited by examiner

Primary Examiner—Stephen Chin
Assistant Examiner—Mohammad Ghayour
(74) Attorney, Agent, or Firm—Carr & Ferrell LLP

(57) ABSTRACT

A system and method of stretching setup and hold times for input signals into synchronous digital circuitry.

12 Claims, 4 Drawing Sheets

STRETCHING SETUP AND HOLD TIMES IN SYNCHRONOUS DESIGNS

The present application is a file wrapper continuation of application Ser. No. 08/418,316, filed Apr. 7, 1995, now abandoned.

BACKGROUND OF THE INVENTION

1. Field of the Invention

The invention generally relates to issues arising in synchronous digital circuit designs, and more specifically to a system and method of stretching and decoupling input setup and hold times in synchronous digital circuit designs.

2. Description of Related Art

Increases in clock speeds of synchronous digital designs have increasingly put more constraints on the so-called input "setup" and "hold" times. Generally speaking, collectively the minimum "setup" and "hold" times define the smallest acceptable sampling window in which a synchronous input signal must be stable for correct operation.

To illustrate the magnitude of setup and hold times for a typical synchronous design, the input signals BRDY# (Burst Ready) and RDY# (Bus ready) have a minimum setup time of 5 nanoseconds and minimum hold time of 2 nanoseconds for a five volt, 50 MHz, CX486DX-50 microprocessor from Cyrix Corporation of Richardson, Tex., which is described in the *CX486DX/DX2—3 and 5 Volt Microprocessors Data Book* (order number 94113-01), herein incorporated by reference.

By way of further background, application specific integrated circuits (ASICs) and in particular, microprocessors, have been migrating towards internal clock multiplication so that internal speeds are 2X or greater than the external (bus) clock. For example, the three volt CX486DX2-80 microprocessor from Cyrix Corporation of Richardson, Tex., generates an 80 MHz internal clock from a 40 MHz external clock. The typical way to "clock multiply" the external clock is to drive a phase-locked loop (PLL) having a divide-by-N (e.g. N=2) divider in its feedback loop to produce an N-times higher frequency output clock. While meritorious in the sense that PLLs can converge the phase between the input source clock and the generated clock, known problems with PLLs for clock multiplication applications include, but are not limited to, falling out-of-lock and excessive lock times—making static operation (i.e. stopping the clock) difficult or impossible.

In an improved, but not entirely satisfactory technique for clock multiplication, a higher frequency clock is reconstituted by generating and combining pulse streams skewed in time with respect to another. This is typically accomplished by routing an external clock source through a delay line and selectively combining temporally skewed pulses with the original external clock source. This clock multiplication technique while superior in many respects, may jeopardize setup and hold time requirements since the reconstituted clock is typically skewed from the external clock. Realistically, with such small minimum hold times (i.e. 2 nanoseconds) any significant skew in the reconstituted clock will violate setup and hold time requirements which are specified with respect to the external clock source.

By way of even further background, "synchronizers" are known which are intended to mitigate the so-called "metastable" conditions which can occur in asynchronous systems where the inputs to a latch/flip-flop do not necessarily have a defined temporal relationship with the synchronous clock. By way of illustration, U.S. Pat. Nos. 4,469,964 to Guttag et al. and 4,663,546, to Eitrheim et al. disclose synchronizer circuits for synchronizing an asynchronous input signal with a local "synchronous" clock. Guttag et al. and Eitrheim et al. however, are devoid of any teachings or suggestions of the problems faced in synchronous designs having tight setup and hold times and internally synthesized clocks, which are typically skewed with respect to synchronous external clocks.

It can be seen from the foregoing therefore, that there is a need for a system and method to stretch and decouple setup and hold times in a synchronous digital circuit design, particularly in a system which employs clock multiplication.

SUMMARY OF THE INVENTION

To overcome the limitations of the prior art described above, and to overcome other limitations that will become apparent upon reading and understanding the present specification, the present invention discloses a system and method of decoupling and stretching input setup and hold times in a synchronous circuit design.

A feature of the present invention is the capability to use delay line type clock multipliers without regard to the impact of internal clock skew on external input setup and hold times.

Another feature of the present invention is increasing the effective input setup time using the skew of an internally produced clock signal.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a system and method to stretch and decouple setup and hold times in synchronous designs, practiced in accordance with the present invention.

DESCRIPTION OF THE PREFERRED EMBODIMENTS

Figure 1:
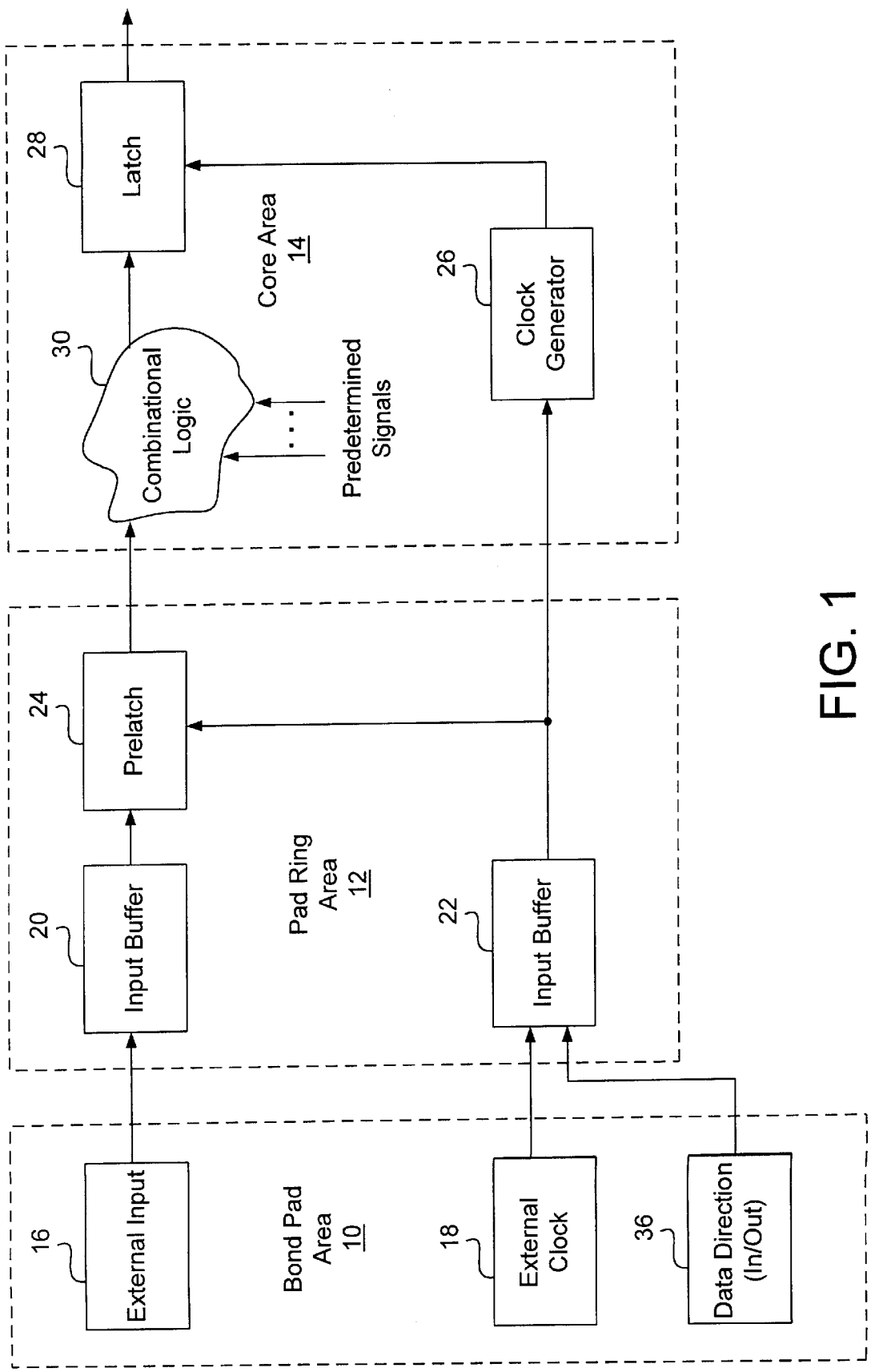
FIG. 1 is a block diagram of a system that decouples and stretches setup and hold times in a synchronous design, practiced in accordance with the principles of the present invention.

In the following description of the preferred embodiment, reference is made to the accompanying drawings which form a part hereof, and in which is shown by way of illustration a specific embodiment in which the invention may be practiced. In order not to obscure the disclosure with structural details which will be readily apparent to those skilled in the art having the benefit of the description herein, the structure, control, and arrangement of conventional circuits have been illustrated in the drawings by readily understandable block representations and schematic diagrams, showing and describing details that are pertinent to the present invention. Thus, the block and schematic diagram illustrations in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

Referring to FIG. 1, a block diagram is depicted of the preferred embodiment for a system that stretches and decouples external setup and hold time requirements from internal clocking circuits, in accordance with the principles of the present invention. FIG. 1 depicts by dashed lines, three general areas described in more detail hereinbelow, which include a bond pad area 10 disposed around the periphery of an integrated circuit, a pad ring area 12 disposed around the periphery but within the space defined by the bond pad area 10, and a core area 14 preferably disposed centrally in the middle of the integrated circuit Each of these areas preferably include specific circuitries as now described below.

Bond pad area 10 include at least one external input signal pad 16 that receives synchronous input data with respect to an external clock and a clock input signal pad 18 that receives an external clock source. Pads 16 and 18 are closely coupled as practicable to the pad ring area 12 which includes input buffer circuitries 20 and 22 respectively, that buffer and provide higher voltage and current drive capability. The details of input buffer circuitries 20 and 22 are not necessary for the understanding of the present invention and those skilled in the art will recognize many expedients for input buffer circuitries 20 and 22 without departing from the scope of the present invention.

The output of input buffer circuitry 20 drives a data input on prelatch 24, described in more detail hereinbelow. The output of input buffer circuitry 22 drives a clock input on prelatch 24 and an input on internal clock generator 26 located in the core area 14. Also included in the core area 14 is a core latch 28 having its clock input coupled to the internal clock generator 26 and having its data input coupled to the output of prelatch 24 preferably, although not exclusively, through combinational logic 30 also residing in the core area 14. The internal clock generator 26 is preferably, although not exclusively, a delay line type— skewing and combining clock pulses to generate a higher frequency clock signal It is to be understood that while delay-line-type clock multiplication generators derive the most benefit from the present invention, PLL-type clock multiplication generators will also will work and derive benefit therefrom.

Figure 2:
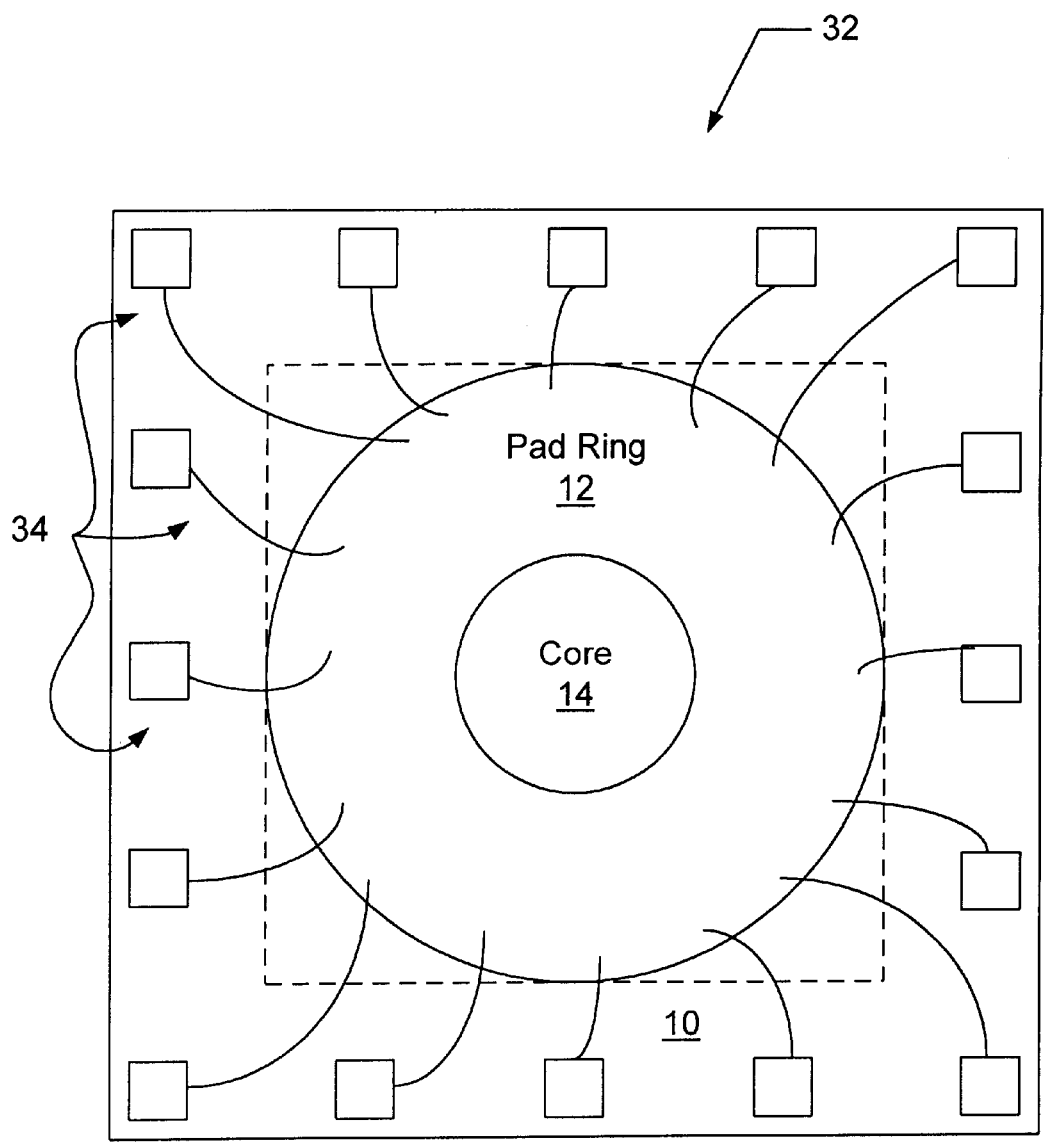
FIG. 2 is a diagram of a preferred integrated circuit topology for practicing the system depicted in FIG. 1.

Reference is now made to FIG. 2 which depicts the preferred integrated circuit topology for practicing the system depicted in FIG. 1. The bond pad area 10 is disposed around the periphery of the integrated circuit 32. Individual bond pads are closely coupled with bonding wires 34 to circuitry (as described above) residing in the pad ring area 12. The core area 14 which is disposed most centrally within integrated circuit 32, includes the clock generator circuitry 26, the latch(es) 28, and combinational logic 30. The clock generator circuitry 26, while not shown in detail, preferably distributes the internally generated clock signal throughout the core area 14 through equal path length means, such as a star distribution network. It should be noted at this point that any induced skew from clock generator circuitry 26 actually increases the "effective" setup time of inputs from the bond pad area 10 as described in more detail hereinbelow. Accordingly, any delay induced by the combinational logic circuitry 30 interposed between the prelatch 24 and the latch 28 can be counterbalanced by the skew induced by clock generator circuitry 26.

Figure 3:
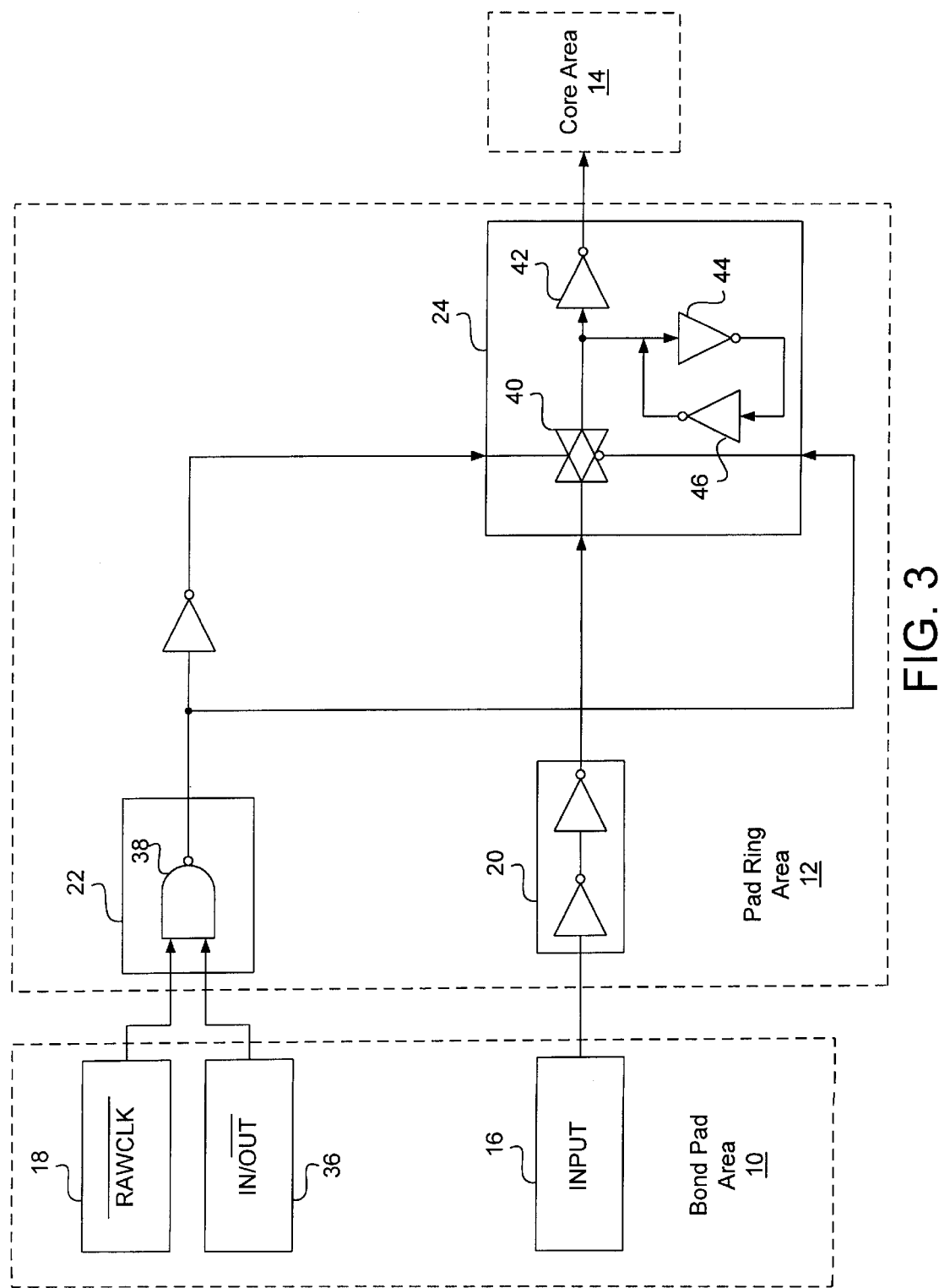
FIG. 3 is a simplified schematic diagram of the system depicted in FIG. 1.

Reference is now made to FIG. 3 which depicts a simplified schematic diagram of the system in FIG. 1. Input signals on pad 16 are buffered by input buffer 20 which in the preferred embodiment, are cascaded first and second inverters. The raw external clock on pad 18 is preferably, although not necessarily, logically NANDed with a data direction signal (IN/$\overline{\text{OUT}}$) on input pad 36 by NAND gate 38 to perform the function of the input buffer circuitry 22, as well as to effectively mask signals on input pad 16 when the data direction signal (IN/$\overline{\text{OUT}}$) on input pad 36 indicates data flow out from—rather than into—the integrated circuit 32.

The prelatch 24 includes a pass gate 40 controlled by the output from NAND gate 38 and its inversion. The pass gate 40 receives its input from input buffer circuitry 20 and drives an input on inverter 42. The input on inverter 42 also has inverters 44 and 46 coupled in front-to-back fashion to it, for holding the level presented on the output of pass gate 40. That is, the input of inverter 44 is driven by pass gate 40 and the output of inverter 44 drives the input of a weak inverter 46 which has its output coupled back to the input of invertey 44. In this manner, the output of pass gate 40 can be removed while the combination and feedback from inverters 44 and 46 maintains the last current level from the output of the pass gate 40. The weak inverter 46 is easily overridden if the output of pass gate 40 is enabled and conflicts with the level that the weak inverter 46 seeks to enforce. The output of driver/inverter 42 drives the data input of latch 28 which resides in the core area 14 and which is clocked by the internal clock generator 26.

Figure 4:
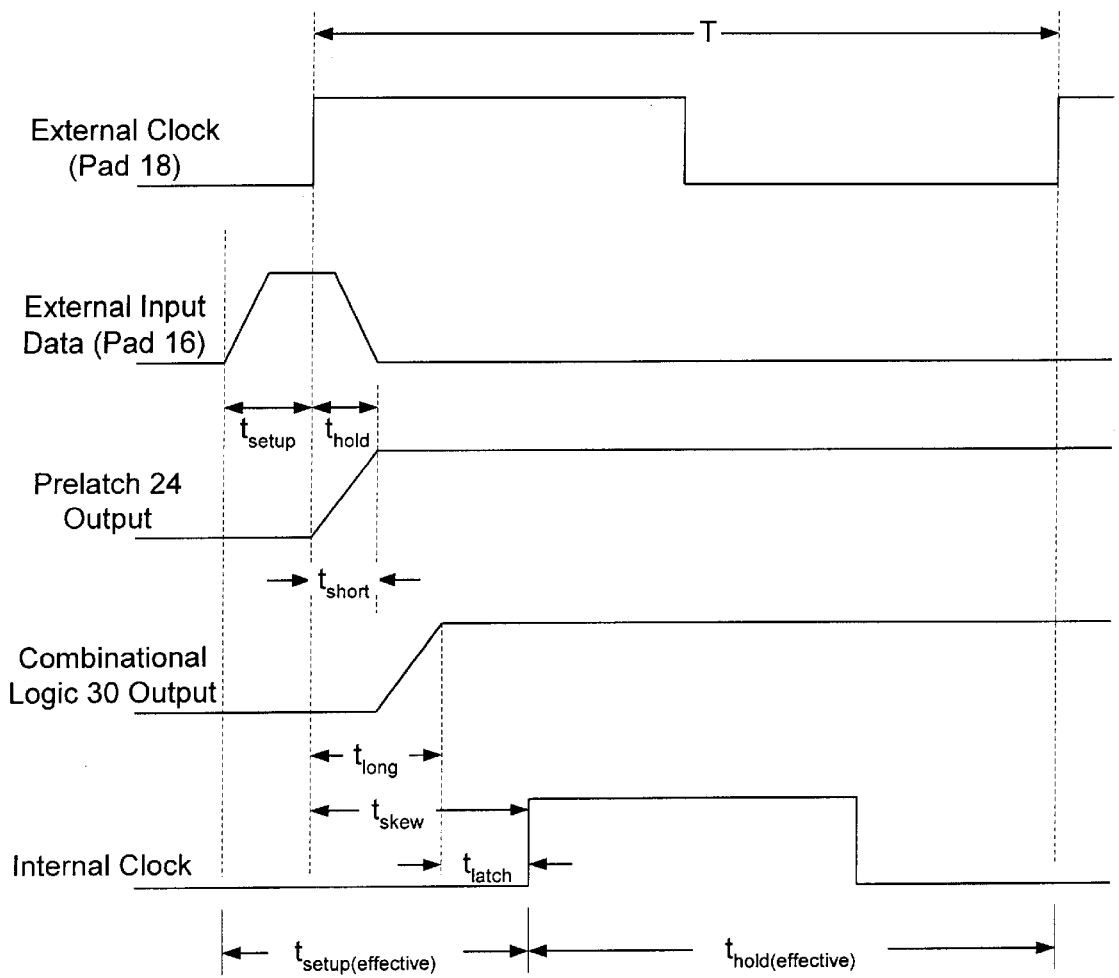
FIG. 4 depicts a timing diagram for signals generated in the system depicted in FIG. 1.

Reference is now made to FIG. 4 which depicts a timing diagram of signals generated in the system depicted in FIG. 1. As can be seen, the external input data signal on input pad 16 complies with the minimum $t_{setup}$ and $t_{hold}$ time requirements with respect to the external clock on input pad 18. The output of prelatch 24 follows the external input data on input pad 16 and latches it a short delay time ($t_{short}$) later. The combinational logic 30 output follows the output of prelatch 24 a longer delay time ($t_{long}$) later but soon enough to meet the setup time ($t_{latch}$) for latch 28. The effective setup time ($t_{setup(effective)}$) for purposes of the internal core latch 28, is therefore the summation of the normal setup time $t_{setup}$ and the induced skew ($t_{skew}$) of internal clock generator 26 from the rising edge of the external clock to the rising edge of the internal clock. Moreover, since the prelatch 24 holds the external input on input pad 16 until the next rising edge of the external clock on input pad 18, the effective hold time ($t_{hold(effective)}$) is the external clock period (T) less the induced time skew ($t_{skew}$) of the internal clock generator 26.

CONCLUSION

Although the Detailed Description of the invention has been directed to a certain exemplary embodiment, various modifications of this embodiment, as well as alternative embodiments, will be suggested to those skilled in the art The invention encompasses any modifications or alternative embodiments that fall within the scope of the claims.

What is claimed is:

1. A synchronous digital apparatus employing internal clock multiplication that stretches setup and hold times for input signals, comprising:

(a) a prelatch having a data input coupled to an external data input, a clock input coupled to an external clock input, and an output;

(b) an internal clock generator having an input coupled to the external clock input and having an output where the internal clock generator produces an output signal which has a frequency greater than the external clock; and (c) a latch having a data input coupled to the output from the prelatch, a clock input coupled to the internal clock generator, and an output.

2. The synchronous digital apparatus as recited in claim 1 further comprising a first input buffer interposed between the external data input and the prelatch data input, and a second input buffer interposed between the external clock input and the internal clock generator input.

3. The synchronous digital apparatus as recited in claim 1 further comprising combinational logic interposed between the output of the prelatch and the data input of the latch.

4. The synchronous digital apparatus as recited in claim 1 wherein the external clock input is gated with a data direction signal to prohibit the prelatch from latching data when the external data input is outbound from the latch output.

5. A system for stretching setup and hold times for input signals in a synchronous apparatus employing internal clock multiplication, comprising:

(a) prelatch means, coupled to receive external data and an external clock, for prelatching the external data synchronous with the external clock;

(b) internal clock generator means, coupled to receive the external clock, for generating an internal clock having a frequency greater than the external clock; and (c) latch means, coupled to the prelatch means and to the internal clock generator means, for latching signals output from-the prelatch means synchronous with the internal clock.

6. The system as recited in claim 5 further comprising a first input buffer means interposed between the external data input means and the prelatch data input means, and a second input buffer means interposed between the external clock input means and the internal clock generator input means for buffering the external data and the external clock.

7. The system as recited in claim 5 further comprising combinational logic means, interposed between the prelatch means and the latch means, for combining predetermined signals with signals output from the prelatch means.

8. The system as recited in claim 5 further comprising data direction gate means, coupled to the external clock, for prohibiting the prelatch means from latching data when data is outbound from the latch means.

9. A method of stretching setup and hold times for input signals in a synchronous digital apparatus employing internal clock multiplication, comprising the steps of:

(a) prelatching an external data input synchronous with an external clock to create a prelatch output;

(b) responsive to the external clock, generating an internal clock having a frequency greater than the external clock; and (c) latching the prelatch output synchronous with the internal clock.

10. The method as recited in claim 9 further comprising the step of buffering the external data input and the external clock.

11. The method as recited in claim 9 further comprising the step of combining predetermined signals with the prelatch output before latching in step (c).

12. The method as recited in claim 9 further comprising the step (d) of inhibiting step (a) responsive to data being outbound from the synchronous digital apparatus.

* * * * *